United States Patent [19]

Prunier et al.

[11] Patent Number: 5,960,079
[45] Date of Patent: Sep. 28, 1999

[54] PORTABLE TELEPHONE WITH ROTARY CONTACTS

[75] Inventors: Jean-Claude Prunier, Herblay; Alain Jauneau, Marly Le Roi; Daniel Richet, Les Mureaux, all of France

[73] Assignee: Framatome Connectors International, Courbevoie, France

[21] Appl. No.: 08/946,406

[22] Filed: Oct. 7, 1997

[30] Foreign Application Priority Data

Oct. 9, 1996 [FR] France ................................. 96 12305
Oct. 9, 1996 [FR] France ................................. 96 12306

[51] Int. Cl.⁶ .................................................. H04M 1/00
[52] U.S. Cl. ............................................................ 379/433
[58] Field of Search ..................... 455/90, 575; 379/433, 379/428, 434

[56] References Cited

U.S. PATENT DOCUMENTS 3,860,312  1/1975  Gordon, Jr. ................................. 339/4
5,027,394  6/1991  Ono et al. ................................ 379/434
5,237,488  8/1993  Moser et al. ............................ 361/729
5,640,690  6/1997  Kudrna ..................................... 455/89
5,732,331  3/1998  Harms ...................................... 455/90

FOREIGN PATENT DOCUMENTS

0547838 A1  6/1993  European Pat. Off. .
1320114     1/1963  France .
2228630     8/1990  United Kingdom .
0535912A2   4/1993  United Kingdom ......... G05B 19/405

Primary Examiner—Jack Chiang
Attorney, Agent, or Firm—Perman & Green, LLP

[57] ABSTRACT

The portable telephone comprises a body (1) including a loudspeaker and a keypad (3) and to which is fixed a cover (4) incorporating a microphone connected by conductors (15) to a circuit situated in the body (1), the cover (4) being hinged to the body so that it can pivot between a position folded against the body and a position deployed away from the latter. The circuit and the microphone are electrically connected by at least one pair of rotary electric contacts (8) incorporated into at least one of the hinges (9, 10) connecting the body (1) to the cover (4).

18 Claims, 4 Drawing Sheets

FIG_1
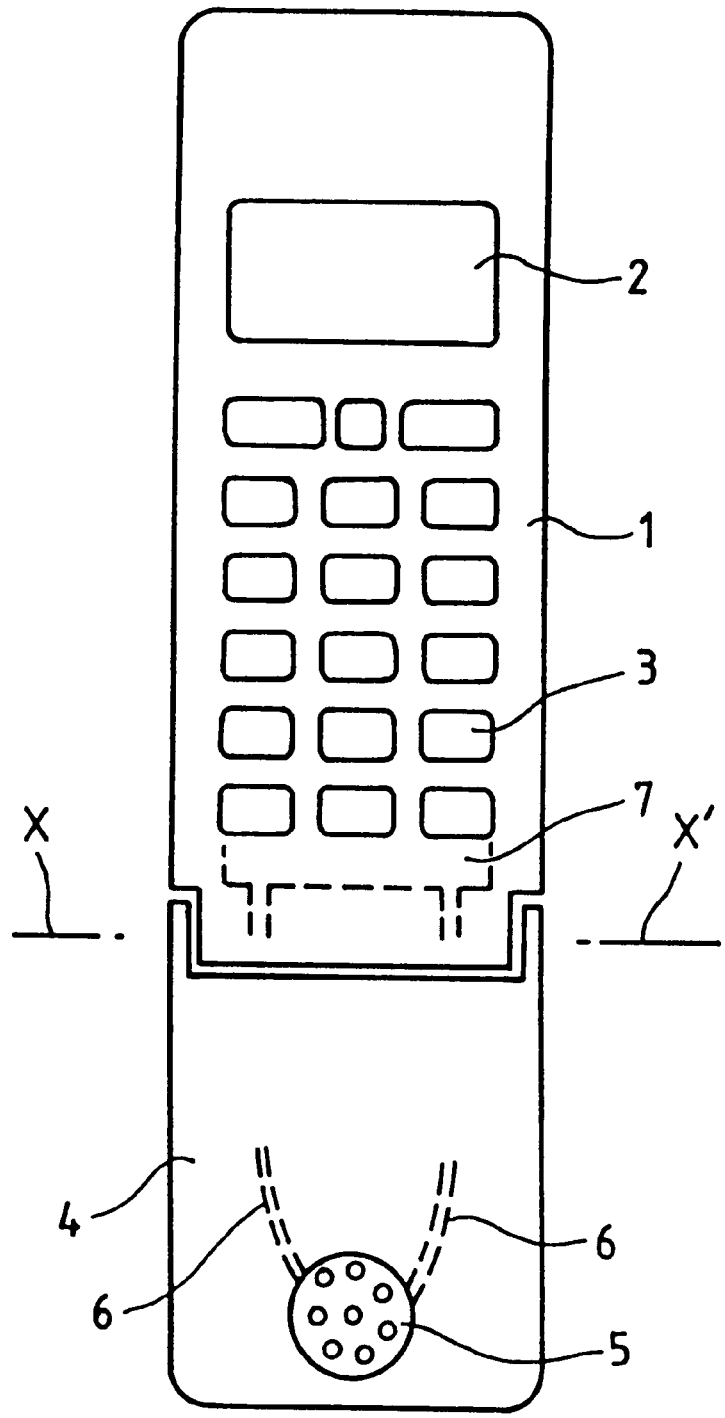

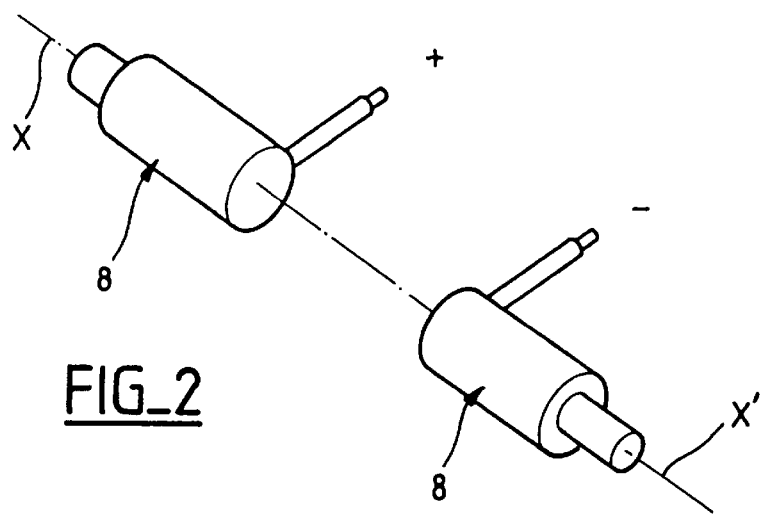
FIG_2
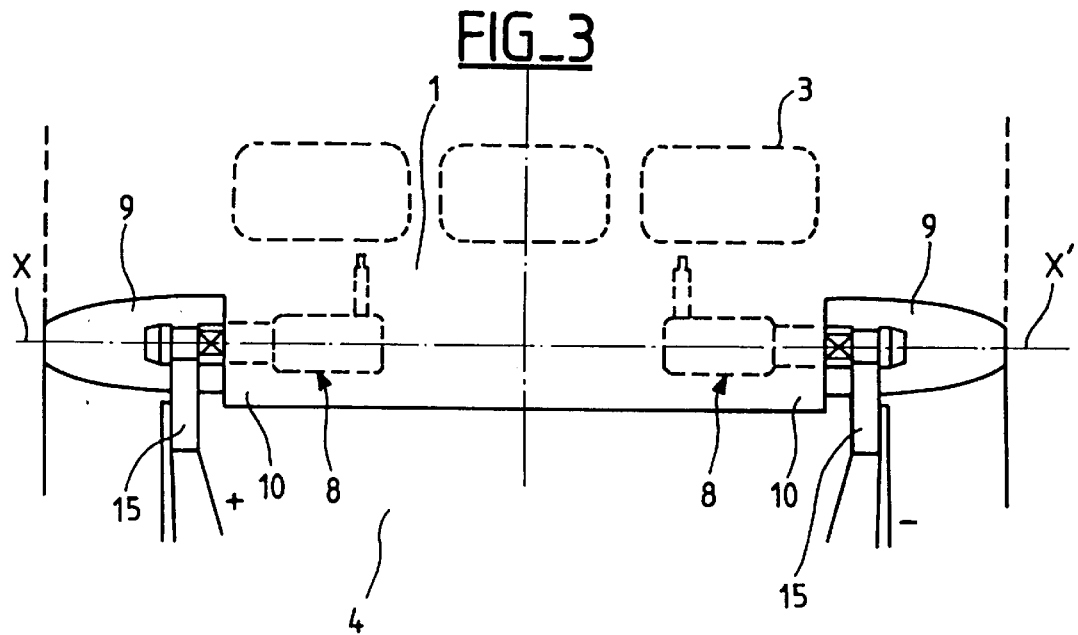
FIG_3
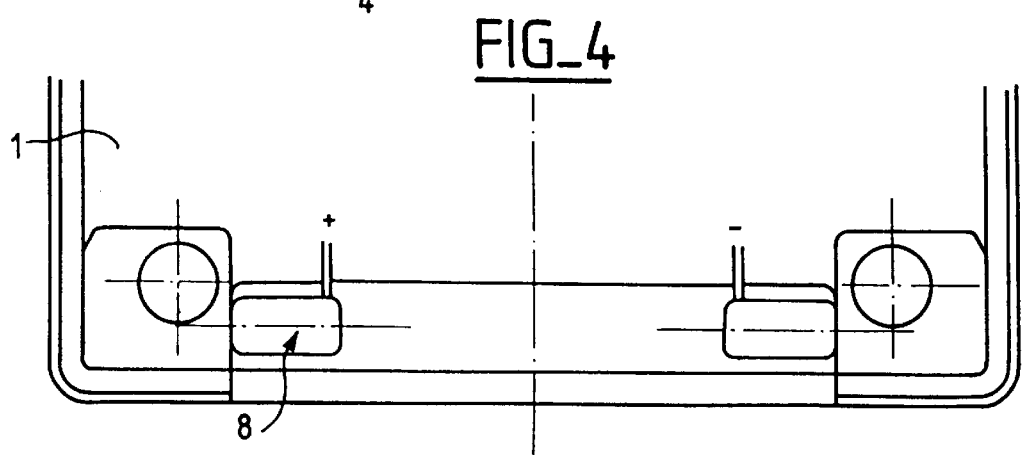
FIG_4

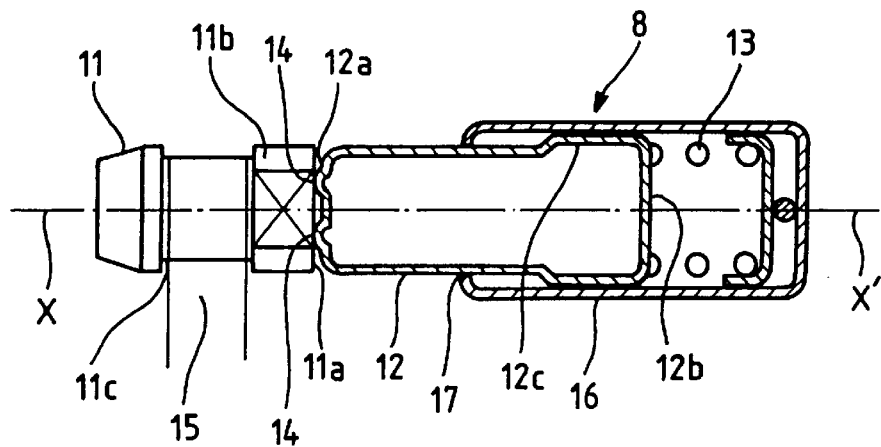
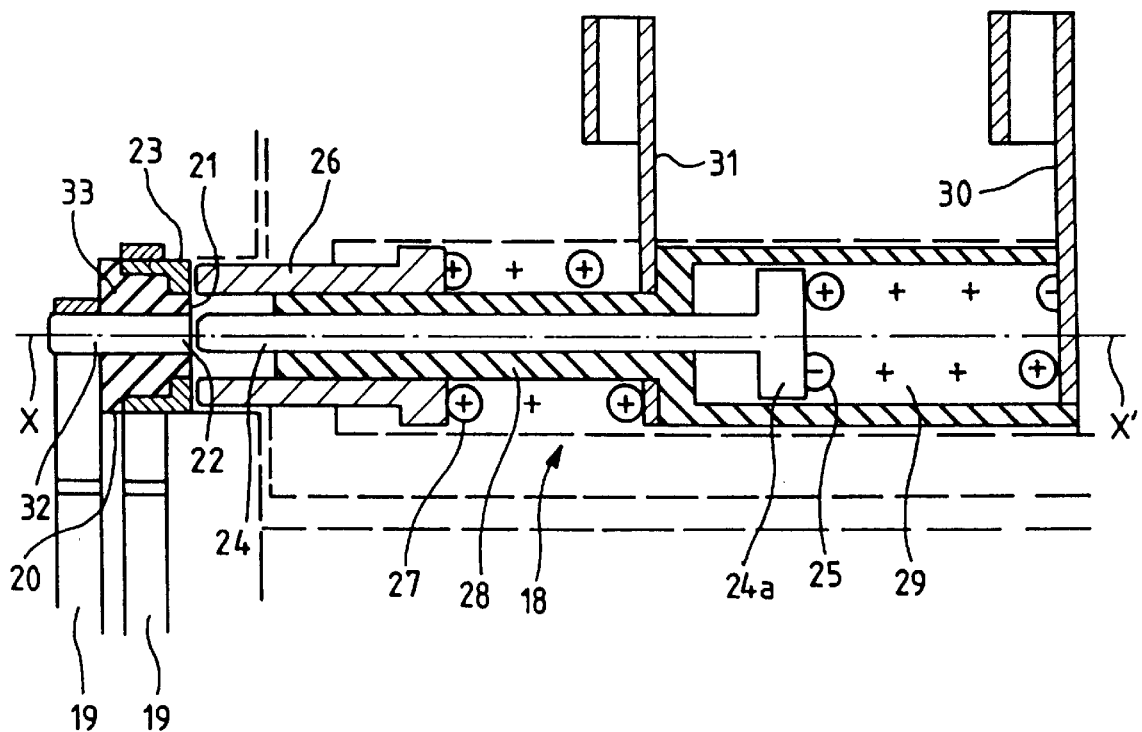

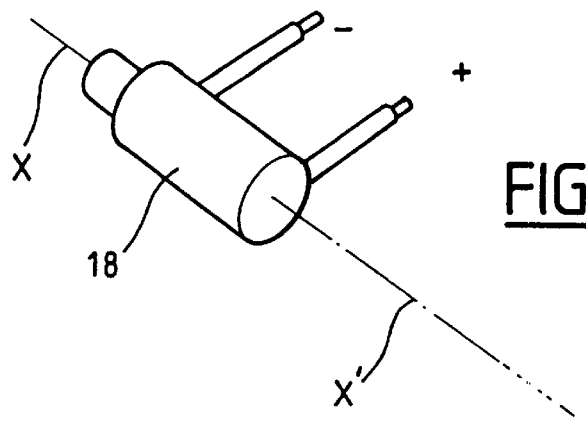
FIG_6
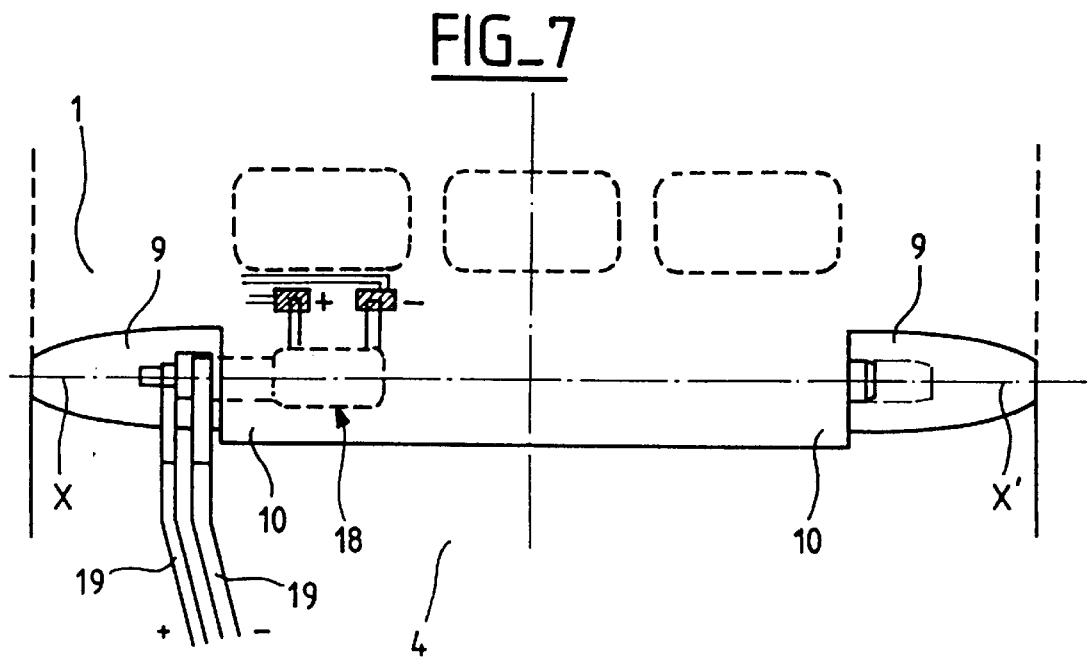
FIG_7
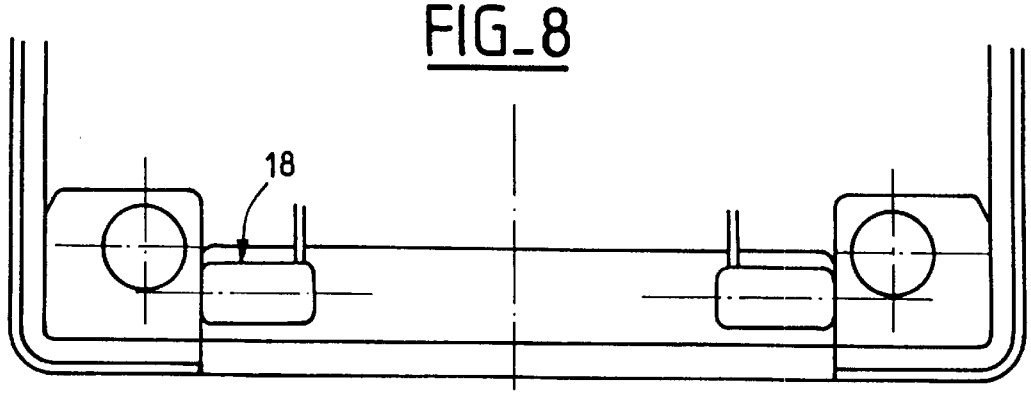
FIG_8

PORTABLE TELEPHONE WITH ROTARY CONTACTS

FIELD OF THE INVENTION

The present invention concerns a portable telephone.

BACKGROUND OF THE INVENTION

Portable telephones of the type comprising a loudspeaker and a keypad to which is fixed a cover incorporating a microphone connected by conductors to a circuit situated inside the body, the cover being hinged to the body so that it can pivot between a position folded against the body and a position deployed away from the latter, are known in themselves.

When not in use, the cover is folded against the body and therefore protects the keypad on the body. In this configuration the portable telephone is of compact overall size and can therefore be easily placed in the pocket of a garment.

In use, the cover is deployed away from the body at a large obtuse angle to the body. In this configuration the microphone is exposed on the face of the cover that is on the same side as the face of the body carrying the loudspeaker.

The distance between the microphone and loudspeaker can be adjusted by increasing or reducing the angle between the body and the cover, so that it matches the distance between the ear and the mouth of the user.

The problem arises with this type of equipment of making an electrical connection between the microphone in the cover and the circuit in the body.

This electrical connection can be made by means of flexible electrical wires that can follow the rotation of the cover relative to the body.

A connection of this kind is not reliable, however.

The aim of the present invention is to create a portable telephone of the above type including electrical connections that can follow the rotation of the cover relative to the body in a reliable manner whilst being totally protected from dust in the environment and the detritus likely to be found in the pocket of a garment.

In accordance with the invention, this portable telephone is characterised in that the circuit and the microphone are electrically connected by at least one pair of rotary electric contacts incorporated into at least one of the hinges connecting the body to the cover.

Being incorporated into one of the two hinges connecting the cover to the body, these rotary contacts assure perfect and reliable transmission of the electric current whilst being mechanically and physically protected from the environment.

In one preferred version of the invention, the body and the cover being moulded, each pair of electric contacts comprises a first member in axial bearing engagement with a second member, each of the members being moulded into one of the two moulded material members constituting a hinge.

This moulding-in assures excellent electrical and mechanical protection of the rotary contact.

The two members are preferably pressed into axial bearing engagement with each other by a spring.

This axial bearing engagement assures a perfect electrical contact.

However, rotary contacts are subject to problems of wear, limited service life, and corrosion by the environment and by dust. It is consequently difficult to implement a rotary contact in which the contact resistance remains low in order to assure good conditions for the transmission of a weak current.

An other aim of the present invention is precisely to provide rotary contacts meeting the above conditions.

In accordance with the invention, these rotary contacts are characterised in that one of the members has a plane contact surface and the other member has a contact surface in axial bearing engagement with the aforementioned plane contact surface and that includes means producing a friction effect on rotation of the two members relative to each other.

In one advantageous version of the invention, the contact surface at the end of the other member incorporates asperities spaced from the rotation axis.

These asperities rub on the plane surface of the facing member to provide self-cleaning of the contact surfaces upon rotation.

Other features and advantages of the invention will emerge further from the following description.

BRIEF DESCRIPTION OF THE DRAWINGS

In the accompanying drawings, which are provided by way of non-limiting example:

FIG. 1 is a plan view of a portable telephone,

FIG. 2 is a perspective view of two pairs of rotary contacts constituting a first embodiment of the invention, FIG. 3 is a diagrammatic plan view showing the incorporation of the rotary contacts into the hinges between the body and the cover of the portable telephone of the invention, FIG. 4 is another plan view showing the incorporation of the rotary contacts into the body of the telephone, FIG. 5 is a plan view partly in longitudinal section of the first embodiment of a pair of rotary contacts of the invention, FIG. 6 is a perspective view of a pair of rotary contacts constituting a second embodiment of the invention, FIG. 7 is a diagrammatic plan view showing the incorporation of the pair of rotary contacts from FIG. 6 into the hinges between the body and the cover of the portable telephone of the invention, FIG. 8 is another plan view showing the incorporation of the pair of rotary contacts into the body of the telephone, FIG. 9 is a partial view in longitudinal section of a second embodiment of a pair of rotary contacts.

DETAILED DESCRIPTION OF THE PREFERRED EMBODIMENTS

In the FIG. 1 embodiment, the portable telephone comprises a body 1 including a loudspeaker 2 and a keypad 3 and to which is fixed a cover 4 incorporating a microphone 5 connected by conductors 6 to a circuit 7 in the body 1.

The cover 4 is hinged to the body 1 about an axis X-X' so that it can pivot between a position folded against the body 1 and a position (that shown in FIG. 1) deployed away from the latter.

In accordance with the invention, the circuit 7 and the microphone 5 are electrically connected by at least one pair of rotary electric contacts 8 (see FIGS. 2 and 3) incorporated in at least one of the hinges 9, connecting the body 1 to the cover 4.

The body 1 and the cover 4 are preferably moulded from a plastics material. Each pair of electric contacts preferably comprises a first member 11 (see FIG. 5) in axial bearing engagement with a second member 12, each of the members 11, 12 being moulded into one of the two moulded plastics material members 9, 10 constituting a hinge.

In the example shown in FIG. 5, the two members 11, 12 are pressed into axial bearing engagement with each other by a spring 13.

FIG. 5 also shows that the member 11 has at one end a plane contact surface 11a perpendicular to the rotation axis X-X' and rubbing against the contact surface 12a at the end of the other member 12.

This contact surface 12a at the end of the member 12 has asperities 14 spaced from the rotation axis X-X'. As the members 11, 12 rotate relative to each other, the asperities 14 produce a self-cleaning effect assuring good transmission of the electric current.

In the example shown in FIGS. 1 and 3 the cover 4 is hinged to the body 1 by two hinges 9, 10 at the ends of the respective sides of the cover 4 and the body 1.

In this version one pair of rotary contacts 8 is incorporated into each hinge 9, 10.

In this version (see FIG. 5), the member 11 is a solid conductive metal member having a part 11b in the shape of a nut which prevents this member rotating relative to the moulded material surrounding it. The member 11 also has a cylindrical part with which is elastically engaged a conductive tongue 15 connected to the microphone 5.

In the version shown in FIG. 5 the member 12 has a conductive metal hollow part on which a second hollow part 16 surrounding the spring 13 pressed against the rear face 12b of the first hollow part 12 slides axially.

The first hollow part 12 has a cylindrical rear portion 12c the outside diameter of which is substantially equal to the inside diameter of the second hollow part 16 and a cylindrical front portion of reduced diameter. The second hollow part 16 has at the end 15 adjacent the first hollow part 12 an annular rim 17 curved towards the reduced diameter portion of the first hollow part 12. This arrangement prevents the spring 13 forcing apart the two parts 12 and 16.

In the FIG. 7 version, the cover 4 is also hinged to the body 1 by two hinges 9, 10 at the ends of the respective sides of the body 1 and the cover 4. However, in this version, only one of the hinges 9, 10 incorporates said pair of rotary contacts 18 providing two coaxial rotary contacts simultaneously, i.e. transmitting current to two conductors 19.

In this example, the pair of contacts 18 (see FIG. 9) comprises a first contact member 20 having a plane face 21 perpendicular to the rotation axis that has a conductive central part 22 electrically insulated from a conductive peripheral part 23 and a second member having an axial conductive rod 24 pressed by a first spring 25 into contact with the conductive central part 22 of the first contact member and a conductive sleeve 26 sliding on an insulative body 28 surrounding the axial rod 24 and acted on by a second spring 27. The end of the conductive sleeve 26 bears on the conductive peripheral part 23 of the first member 20.

In this embodiment the first spring 25 is made of a conductive metal and is housed in a hollow compartment 29 at the rear of the insulative body 28 surrounding the conductive rod 24. One end of the spring 25 is in contact with an enlarged rear part 24a of the conductive rod 24 and the other end of the spring 25 is in contact with a conductive connecting lug 30.

Also, the second spring 27 surrounds the insulative body 28.

One end of this spring 27 is in contact with the conductive sleeve 26 and the other end of the spring 27 is in contact with a second conductive connecting lug 31.

Moreover, the end of the conductive rod 24 and the end of the conductive sleeve 26 bearing against the corresponding surfaces of the first member 20 comprise asperities that are not shown. Upon rotation, these asperities produce a self-cleaning effect assuring excellent transmission of current.

The conductive central part 22 of the first member is part of an axial rod 32 with one end of which is elastically engaged the curved end of a contact blade 19 electrically connected to the microphone.

The conductive peripheral part 23 of the first member 20 is part of a ring that surrounds an insulative block 33 and with which is elastically engaged the curved end of a second contact blade 19 electrically connected to the second terminal of the microphone.

Consequently, the rotary contact just described enables the circuit 7 contained in the body 1 to be connected to the two conductors 6 connected to the microphone 5 via conductors connected to the two lugs 30, 31.

We claim:

1. Portable telephone comprising a body (1) including a loudspeaker (2) and a keypad (3) and to which is fixed a cover (4) incorporating a microphone (5) connected by conductors (6) to a circuit (7) situated in the body (1), the cover (4) being hinged to the body (1) so that it can pivot between a position folded against the body (1) and a position deployed away from the body, characterised in that the circuit (7) and the microphone (5) are electrically connected by at least one pair of rotary electric contacts (8, 18) incorporated into at least one of the hinges (9, 10) connecting the body (1) to the cover (4), wherein the body (1) and the cover (4) being of moulded material, characterised in that each pair of electric contacts (8) comprises a first conductive member (11) in axial bearing engagement with a second conductive member (12), each of the members (11, 12) being moulded into one of the two moulded material members (9, 10) constituting a hinge.

2. Portable telephone according to claim 1 characterised in that the two members (11, 12) are pressed into axial bearing engagement with each other by a spring (13).

3. Portable telephone according to claim 2, characterized in that the two conductive members (11,12) are disposed along the rotation axis of the hinge (9,10), that one of the members (11) has a plane contact surface (11a) and the other member (12) has a contact surface (12a) in axial bearing engagement with the aforementioned plane contact surface and that includes means (14) producing a friction effect on rotation of the two members relative to each other.

4. Portable telephone according to claim 1, characterised in that one member (11) comprises at one end a plane contact surface (11a) perpendicular to the rotation axis (X-X') rubbing against the contact surface (12a) at the end of the other member (12).

5. Portable telephone according to claim 4 characterised in that the contact surface (12a) at the end of the other member (12) incorporates asperities (14) spaced from the rotation axis (X-X').

6. Portable telephone according to claim 1, the cover (4) being hinged to the body (1) by two hinges at the ends of respective sides of the cover and the body, characterised in that one pair of rotary contacts (8) is incorporated into each hinge (9, 10).

7. Portable telephone according to claim 6 characterised in that one member (11) is a solid conductive metal member having one part (11b) incorporating means for preventing rotation of that part relative to the moulded material surrounding it and a cylindrical part (11c) with which is elastically engaged a conductive tongue (15) connected to the microphone.

8. Portable telephone according to claim 6 characterised in that the other member (12) has a conductive metal first hollow part on which a second hollow part (16) surrounding a spring (13) bearing against the rear face (12b) of the first hollow part (12) slides axially.

9. Portable telephone according to claim 8 characterised in that the first hollow part (12) has a cylindrical rear portion (12c) the outside diameter of which is substantially equal to the inside diameter of the second hollow part (16) and a cylindrical front part having a reduced diameter, the second hollow part (16) having at its end adjacent the first hollow part an annular rim (17) curved towards the reduced diameter portion of the first hollow part (12).

10. Portable telephone according to claim 1, the cover (4) being hinged to the body (1) by two hinges (9, 10) at the ends of respective sides of the cover and the body, characterised in that one of the hinges (9, 10) incorporates a pair of rotary contacts (18) providing two coaxial rotary contacts simultaneously.

11. Portable telephone according to claim 10 characterised in that the pair of contacts (18) comprises a first contact member (20) having a plane face (21) perpendicular to the rotation axis (X-X') that has a conductive central part (22) electrically insulated from a conductive peripheral part (23) and a second member including an axial conductive rod (24) pressed by a first spring (25) into contact with the conductive central part (22) of the first contact member and a conductive sleeve (26) sliding on an insulative body (28) surrounding the axial rod (24) and acted on by a second spring (27), the end of the conductive sleeve (26) bearing against the conductive peripheral part (23) of the first member (20).

12. Portable telephone according to claim 11 characterised in that the first spring (25) is made of a conductive metal and is housed in a hollow compartment (29) at the rear of the insulative body (28) surrounding the conductive body (24), one end of the spring (25) being in contact with an enlarged rear part (24a) of the conductive rod (24) and the other end of the spring (25) being in contact with a conductive connecting lug (30).

13. Portable telephone according to claim 12 characterised in that the second spring (27) surrounds the insulative body (28), one end of this spring being in contact with the conductive sleeve (26) and the other end of this ring being in contact with a second conductive connecting lug (31).

14. Portable telephone according to claim 11 characterised in that the end of the conductive rod (24) and the end of the conductive sleeve (26) bearing against the corresponding surfaces of the first member (20) comprise asperities.

15. Portable telephone according to claim 11 characterised in that the conductive central part (22) of the first member (20) is part of a rod (32) with one end of which is elastically engaged the curved end of a contact blade (19).

16. Portable telephone according to claim 11 characterised in that the conductive peripheral part (23) of the first member is part of a ring that surround an insulative block (33) and with which is elastically engaged the curved end of a contact blade (19).

17. Portable telephone comprising a body (1) including a loudspeaker (2) and a keypad (3) and to which is fixed a cover (4) incorporating a microphone (5) connected by conductors (6) to a circuit (7) situated in the body (1), the cover (4) being hinged to the body (1) so that it can pivot between a position folded against the body (1) and a position deployed away from the body, characterized in that the circuit (7) and the microphone (5) are electrically connected by at least one pair of rotary electric contacts (8, 18) incorporated into at least one of the hinges (9, 10) connecting the body (1) to the cover (4), wherein the pair of contacts (18) comprises a first contact member (20) which has a conductive central part (22) which is part of a rod (32) with one end of which is elastically engaged the curved end of a contact blade (19).

18. Portable telephone comprising a body (1) including a loudspeaker (2) and a keypad (3) and to which is fixed a cover (4) incorporating a microphone (5) connected by conductors (6) to a circuit (7) situated in the body (1), the cover (4) being hinged to the body (1) so that it can pivot between a position folded against the body (1) and a position deployed away from the body, characterized in that the circuit (7) and the microphone (5) are electrically connected by at least one pair of rotary electric contacts (8, 18) incorporated into at least one of the hinges (9, 10) connecting the body (1) to the cover (4), wherein the pair of contacts (18) comprises a first contact member (20) having a plane face (21) perpendicular to the rotation axis (X-X') that has a conductive central part (22) electrically insulated from a conductive peripheral part (23), wherein the conductive peripheral part (23) of the first member is part of a ring that surrounds an insulative block (33) and with which is elastically engaged the curved end of a contact blade (19).

* * * * *